June 9, 1959  W. E. McCOWN ET AL  2,890,354
VIBRATORY DEVICES
Filed July 1, 1954
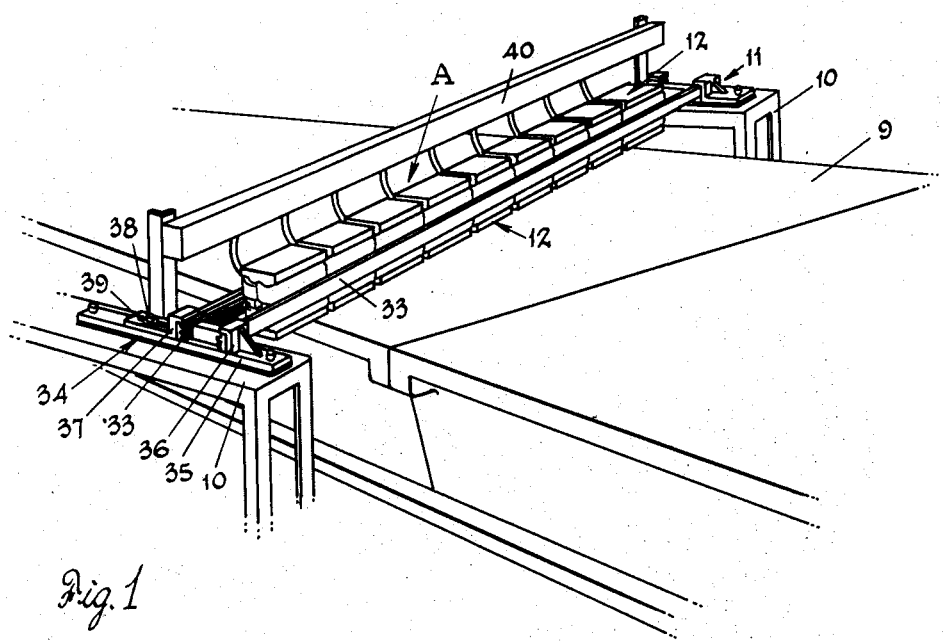
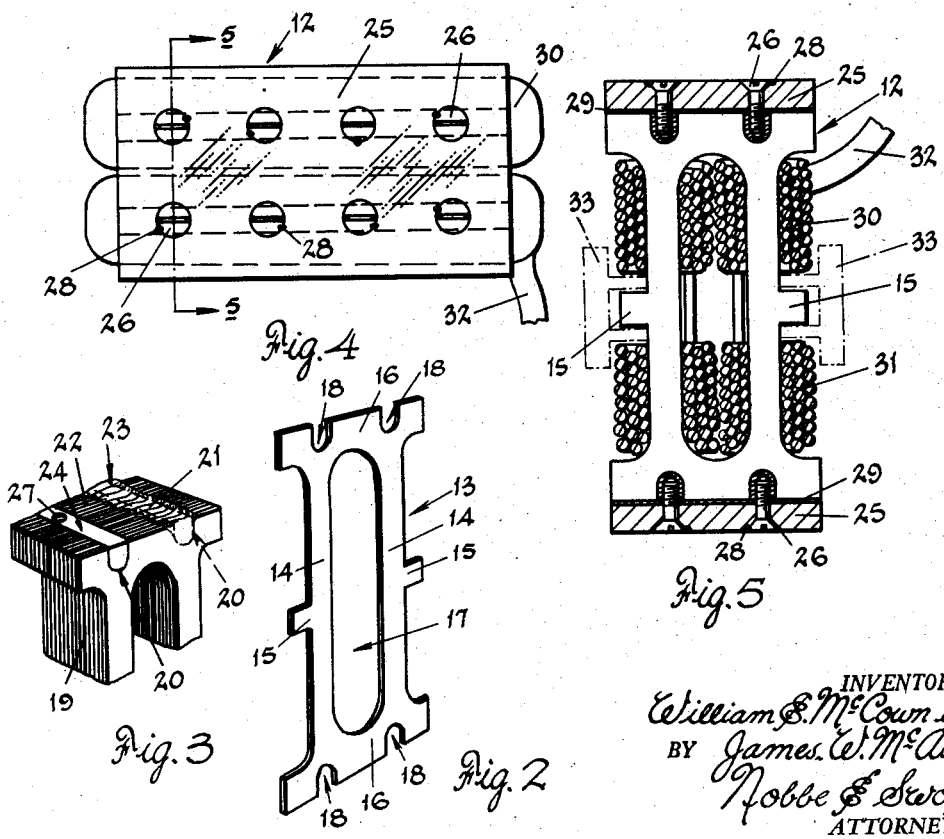
INVENTORS
William E. McCown and
BY James W. McAuley
Nobbe & Swope
ATTORNEYS United States Patent Office 2,890,354
Patented June 9, 1959

2,890,354

VIBRATORY DEVICES

William E. McCown, Maumee, and James W. McAuley, Perrysburg, Ohio, assignors to Libbey-Owens-Ford Glass Company, Toledo, Ohio, a corporation of Ohio Application July 1, 1954, Serial No. 440,775

5 Claims. (Cl. 310—26)

This invention relates broadly to vibratory devices and more particularly to magnetostrictive vibratory devices.

Heretofore, in using laminated magnetostrictive vibratory devices or transducers to produce cavitation in a liquid energy conducting medium, it was generally found that the cavitation produced a wearing effect upon the laminated structure and reduced the efficiency of the vibratory device. This cavitation effect occurs when a liquid is vibrated at high frequencies and results from the alternate formation and collapse of gas bubbles which form positive and negative pressure fronts and act to produce alternate stresses on the molecular structure of a material acted upon thus causing it to disintegrate or erode. The action can be employed in many useful ways, such as in the cleansing, abrading or drilling of material, but this same action also affects the transducer, as well as the work, and in time causes the portions of the vibratory device that creates the cavitation action to also erode or wear away.

To alleviate this condition, it has been found desirable to provide protective wear-plates or shoes at the end of the laminated structure or core of the transducer, which is in contact with the energy conducting medium in order to protect the core from excessive wear.

However, it has heretofore been the practice to bond the multiplicity of thin metal plates, that form the laminae of the transducer core, together with an adhesive binder; and to attach the wear plates to the ends of the resulting core by soldering and then to wind the core.

This provides a reasonably satisfactory original structure but, when the protective plates become worn or eroded, they can not be replaced without applying sufficient heat to melt the solder bond between them and the laminated core; and, even when silver or other soft solder methods have been used, the heat necessary to remove the plates will damage the electrical windings which have been placed around the core after the original plates had been soldered thereto. Consequently, the relatively simple act of replacing the worn shoes also required the additional more expensive and time consuming act of rewinding the core.

Moreover, it was impractical to attach the plates directly to the laminated core by such mechanical means as screws or bolts, because the wedge action of the screws caused the respective laminae to spread apart and break the adhesive bond holding them together.

It is accordingly a primary object of this invention to provide a magnetostrictive or electro-mechanical transducer of novel construction that is remarkably efficient in operation and easy to service.

Another object is the provision of a new and improved method of bonding the laminae of magnetostrictive transducers together.

Still another object is to provide a relatively simple and readily operable mechanical means for removably securing protective wear-plates or shoes to the laminated cores of such transducers whereby the plates may be attached or replaced without injury to the transducer windings.

Other objects and advantages of the invention will become more apparent during the course of the following description when taken in connection with the accompanying drawings.

In the drawings, wherein like numerals are employed to designate like parts throughout the same:

Fig. 1 is a perspective view of a table cleaning device, employing a plurality of transducers constructed in accordance with the invention and mounted in operative position above a conventional glass grinding and polishing table;

Fig. 2 is a perspective view of a thin metal plate to be used as one of the laminae in a transducer;

Fig. 3 is a fragmentary perspective view showing a plurality of the laminae bonded together into a core;

Fig. 4 is a top plan view of a transducer constructed in accordance with the invention; and Fig. 5 is a sectional view taken substantially on line 5—5 of Fig. 4.

The present invention is not necessarily restricted to any particular size or shape of transducer, or to transducers that are to be used for any particular purpose.

Referring now more particularly to the drawings, there is illustrated in Fig. 1 a portion of a well known type of continuous grinding and polishing system in which a series of work tables 9 are moved along a predetermined path to carry glass blanks first beneath a series of grinders and then beneath a series of polishers to surface the same. Glass blanks to be ground and polished are held in position on the tables by bedding them in plaster of Paris and, after removal of glass from the tables, the hardened plaster must also be removed before the tables are ready to receive new blanks.

For this purpose a cleaning device designated in its entirety by the letter A is mounted on standards 10 above the path of the work tables 9. The cleaning device A includes a support frame 11 which carries a plurality of transducers 12 of the character contemplated by the invention. When a supply of a liquid conducting medium is introduced between the tables 9 and the working faces of the transducers 12, vibration of the transducers will create the necessary cavitation action to effectively clean the plaster from the tables.

Each of the transducers 12 comprises a body portion formed of a plurality of thin plates or laminae 13 which may be stamped or cut from thin sheets of a ferro-magnetic alloy or magnetostrictive material such as nickel, iron alloys, etc., which material has the property of being changed in dimension when subjected to high frequency alternating fields. More particularly, the laminae 13 are generally rectangular in shape and include symmetrical parallel longitudinal sides or legs 14 having tabs 15 protruding therefrom at a nodal point of the laminae; and symmetrical transverse ends 16 which, together with the longitudinal sides 14, define a longitudinal slot 17 therebetween. The legs 16 are located along an antinodal area of the laminae and, according to the invention, are provided with two notches 18 therein, the purpose of which will later be described.

Previous to their lamination into a composite body, the laminae or plates 13 are each provided with a layer of an insulating material which serves to insulate the plates from each other when they are stacked in superimposed relation. This layer is preferably a coating of the oxide of the metal of which the laminae are made and can be produced by heating the laminae at a temperature sufficient to produce an oxide coating of the desired thickness. If desired, however, layers of other well known insulating materials such as mica may be used to provide the necessary insulation between the laminae.

After the insulating coating has been placed on the side surfaces of the laminae or plates 13, they are stacked together in face to face relation to form a core 19 which will best be seen in Fig. 3. As will be apparent, the notches 18 form continuous grooves 20 in the core when the plates 13 have been stacked together and properly oriented with respect to each other. These grooves 20 serve a twofold purpose in bonding the laminae of the core together and in providing a removable mounting for the wear plates.

Thus, the plates or laminae 13 may be welded together by the striking of a bead 21 along the groove 20 to maintain the end portions in their proper oriented position and to integrally bind the laminae together. We have found that the grooves 20 afford adequate surface area for the welding material to engage the laminae and to hold them securely without having the weld affect the overall properties of the transducer.

As will be noted in Fig. 3, the welding material is preferably placed in sufficient amounts to fill the grooves 20 to a point substantially level with the antinodal side surface 22 of the core 19 as indicated at 23, after which the surface is ground to make it flush with the side 22 as indicated at 24 in Fig. 3. While many materials may be used to weld the laminae together, it is preferred that the welding material be similar to the material of the plates or laminae themselves so that the magnetostrictive qualities thereof will not be appreciably changed by the presence of the weld.

To protect the antinodal sides 22 of the core 19 from the eroding effects of the cavitation produced in the medium interposed between the transducer and the article being cleaned in accordance with this invention, shoes or plates 25 are provided as protective coverings therefor; and, with the construction just described, these protective plates or shoes can be readily secured to the core by means of screws 26 engaging tapped holes 27 spaced along the weldments 21 in the grooves 20. The screws 26 may be set in place and restricted from working loose, when the transducer is vibrating, by means of punch marks 28. These marks may be formed by striking the outer circumference of the screw head with a punch to form a slight wedge 28 between the shoes and the screw. To provide for intimate contact between the core 19 and the protective plate 25, there are provided shims 29 formed of a suitable soft material which will deform to fill in any uneven areas between the said core and plate and allows maximum vibration energy to be transmitted from the core to the protective plate.

From the foregoing, it will be apparent that the weldment 21 formed along the grooves 20 serves the function of forming a very durable and lasting bond between the respective laminae 13, and also provides a means whereby the protective plates or shoes 25 may be removably attached to the core 19 of the transducer without requiring damaging heat to remove or attach them. It should be pointed out that the shoes or plates should be be of a material having acoustic properties similar to the material of the laminae 13 and core 19 formed therefrom so that the vibrating properties of the magnetostrictive plates will not be dampened.

These vibrating properties as mentioned hereinabove are energized when the laminae are subjected to a high frequency alternating field. As herein provided, the energy means includes a direct current winding 30 wound around the parallel legs 14 of the core 19, and an alternating current winding 31 also wound around the legs 14 of the core, both windings being connected to a power source through a cable 32. The direct current winding 30 establishes a constant polarizing magnetic field, while the alternating current winding 31 generates an alternating field which is superimposed on the direct field and causes the laminae to undergo alternate expansions and contractions thus producing the vibration effect of the core 19 and its associated protective shoe 25. However, while a direct current winding has been shown herein, it should be understood that permanent magnetic means may be used in association with the core to produce the polarizing magnetic field, or both the direct current and alternating current may be superimposed on the same winding if desired.

In mounting the transducers above the work tables as shown in Fig. 1, it is necessary that they be held at a point of substantially no vibration, or in other words, at a node of the vibratory system so that their vibrating energy will not be dissipated in the mounting itself. The node point of the vibratory system disclosed herein is located along a horizontal axis passed through the tabs 15 midway between the antinode areas along the edges of the transverse sides 16. These tabs 15 provide a means whereby the assembled transducer 12 may be mounted in U-shaped channels 33 of the support frame 11 which has a high impedance to vibration (Figs. 1 and 4). The channels 33 are held in position by means of clamps 34 carried by the standards 10.

Each of the clamps 34 comprises a fixed base 35 on which are mounted a fixed arm 36 and an adjustable clamping arm 37. The adjustable clamping arm 37 is slidable along said base, and guided in its movement by a clamping bolt 38 which passes through a slot 39 in the arm and is threaded into the base 35. As a result of the rigid support afforded by the channels 33, the portions of the laminae adjacent the tabs or nodes 15 undergo little if any longitudinal displacement because of their nodal location, while the end areas of the laminae and the plates attached thereto undergo an oscillatory longitudinal displacement at the frequency and amplitude of the system.

When it is desired to remove one or several of the transducers from the support frame 11 to replace their protective plates or shoes 25, it is only necessary to disconnect the power lead 32 and its associated plug (not shown) from the power supply housing 40 mounted above the tables, to loosen the clamping bolt 38 and to slide the adjustable arm 37 away from the stationary arm 36 so that the U-shaped channels 33 may slide apart and disengage the tab support 15 on the transducer core. Once the transducers have been removed from the support frame, the protective plates or shoes 25 may be removed by releasing the screws 26 from their set position.

It will thus be apparent that the method disclosed herein for laminating transducer cores, and for attaching of the shoes or protective plates 25 to such cores provides an improved transducer core whose life and that of its associated windings will be prolonged, thus affording considerable savings in both maintenance and replacement costs.

It is to be understood that the form of the invention disclosed herein is to be taken as the preferred embodiment thereof, and that various procedural changes, as well as changes in the shape, size and arrangement of parts, may be resorted to without departing from the spirit of the invention or the scope of the following claims.

We claim:

1. An electro-mechanical transducer having antinodal points along its end portions and a node point along its center portion comprising, a plurality of laminae of a magnetostrictive alloy, a welded bead along an end portion of said transducer serving to joint the laminae together at their ends, and removable protective means covering said laminae along at least one of said antinodal portions.

2. An electro-mechanical transducer having antinodal points along its end portions and a node point along its center portion comprising, a plurality of laminae of a magnetostrictive alloy having a groove along an antinodal end portion thereof, a welded bead carried in said groove and serving to joint the laminae together, and protective means removably carried by said welded bead to protect the end portion of said laminae.

3. An electro-mechanical transducer comprising a core formed of a plurality of laminae of a magnetostrictive alloy having a groove therein along at least one side thereof, a weldment carried in said groove serving to join the laminae together, said weldment being substantially flush with said core, and protective means removably attached to said weldment to protect portions of said core and laminae.

4. A magnetostrictive transducer for imparting a vibratory energy to a medium, a plurality of laminae of a ferromagnetic material, a welded bead along a pair of opposed sides of said laminae for uniting the laminae into a composite structure, and protective means covering said laminae along the sides on which said welded bead is placed for contacting said medium.

5. A magnetostrictive transducer as claimed in claim 4, in which said protective means is removable.

References Cited in the file of this patent
UNITED STATES PATENTS

| | | |
|---|---|---|
| 1,756,672 | Barr | Apr. 29, 1930 |
| 1,816,859 | Linders | Aug. 4, 1931 |
| 2,076,330 | Wood | Apr. 6, 1937 |
| 2,632,858 | Calosi | Mar. 24, 1953 |
| 2,636,998 | Davis et al. | Apr. 28, 1953 |
| 2,679,607 | Potter | May 25, 1954 |
| 2,680,285 | Furnas | June 8, 1954 |

UNITED STATES PATENT OFFICE
CERTIFICATE OF CORRECTION

Patent No. 2,890,354            June 9, 1959

William E. McCown et al

It is hereby certified that error appears in the printed specification of the above numbered patent requiring correction and that the said Letters Patent should read as corrected below.

Column 3, line 57, strike out "be", second occurrence; column 4, lines 66 and 75, for "joint", each occurrence, read — join —.

Signed and sealed this 19th day of April 1960.

(SEAL)
Attest:

KARL H. AXLINE            ROBERT C. WATSON
Attesting Officer            Commissioner of Patents